United States Patent [19]

Kim

[11] Patent Number: 5,503,362
[45] Date of Patent: Apr. 2, 1996

[54] WATER-SUPPLY VALVE OF A WASHING MACHINE

[75] Inventor: Jinsoo Kim, Incheon, Rep. of Korea

[73] Assignee: Daewoo Electronics Co., Ltd., Seoul, Rep. of Korea

[21] Appl. No.: 363,345

[22] Filed: Dec. 23, 1994

[30] Foreign Application Priority Data

May 31, 1994 [KR] Rep. of Korea ............... 94-12205

[51] Int. Cl.⁶ ............... F16K 31/04; F16K 31/128; F16K 31/528
[52] U.S. Cl. ............... 251/30.03; 74/57; 74/569; 134/57 R; 251/45; 251/229; 251/252
[58] Field of Search ............... 251/30.02, 30.03, 251/30.04, 30.05, 45, 46, 129.04, 129.15, 129.19, 129.2, 230; 252/252; 74/25, 57, 99 R, 99 A, 567, 569; 134/56 R, 57 R, 57 D, 56 D, 58 R

[56] References Cited

U.S. PATENT DOCUMENTS

| | | |
|---|---|---|
| 1,644,171 | 10/1927 | Caldwell ............... 251/230 |
| 1,885,846 | 11/1932 | Littlefield ............... 251/30.03 |
| 2,946,551 | 7/1960 | Kovach ............... 251/30.03 |
| 2,990,155 | 6/1961 | Selinder ............... 251/30.03 |
| 3,410,301 | 11/1968 | Merriner et al. ............... 251/30.02 |
| 3,672,627 | 6/1972 | McCarty, Jr. et al. ............... 251/30.03 |
| 3,780,980 | 12/1973 | Kallel ............... 251/252 |
| 3,870,275 | 3/1975 | Kallel ............... 251/252 |
| 3,994,318 | 11/1976 | Ishigaki ............... 251/30.03 |
| 4,350,322 | 9/1982 | Mueller ............... 251/252 |
| 5,090,441 | 2/1992 | Richmond ............... 251/30.02 |

Primary Examiner—George L. Walton
Attorney, Agent, or Firm—Oliff & Berridge

[57] ABSTRACT

Disclosed is a water-supply valve of a washing machine in which the consumption of electric power can be minimized in opening and closing the valve to supply water into and block off the water supply from a washing tub of the washing machine. In the water-supply valve, an actuator rod is elevated against downward biasing force of a spring by a magnetic force of the solenoid generated by applying a voltage thereto, and then is retained at its uppermost position by a stopper. The stopper has a guide groove of an inverted-heart shape formed therein, which has four guide surfaces.

17 Claims, 6 Drawing Sheets

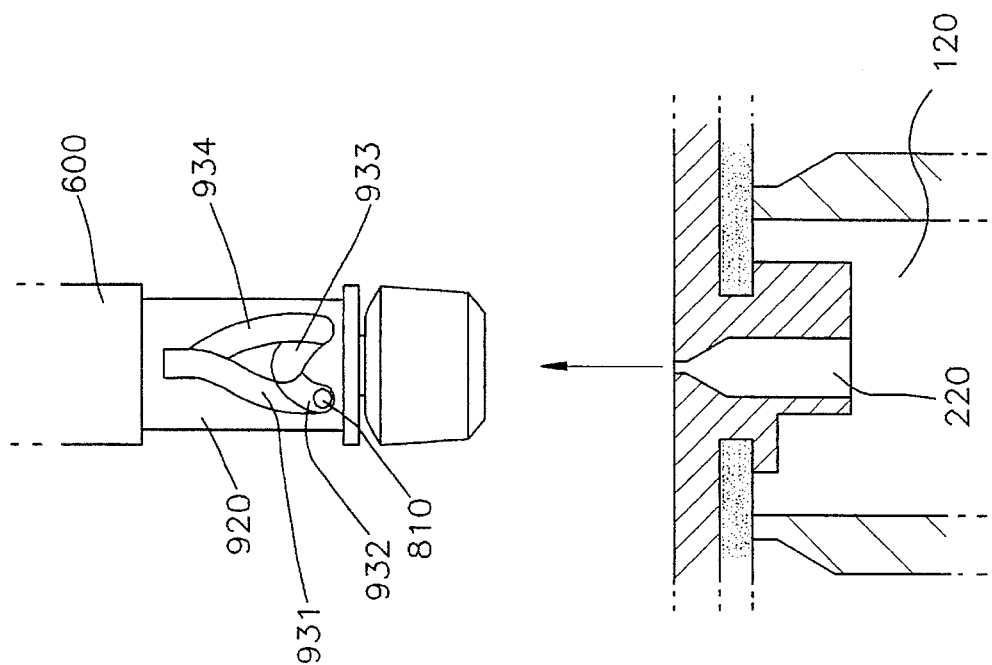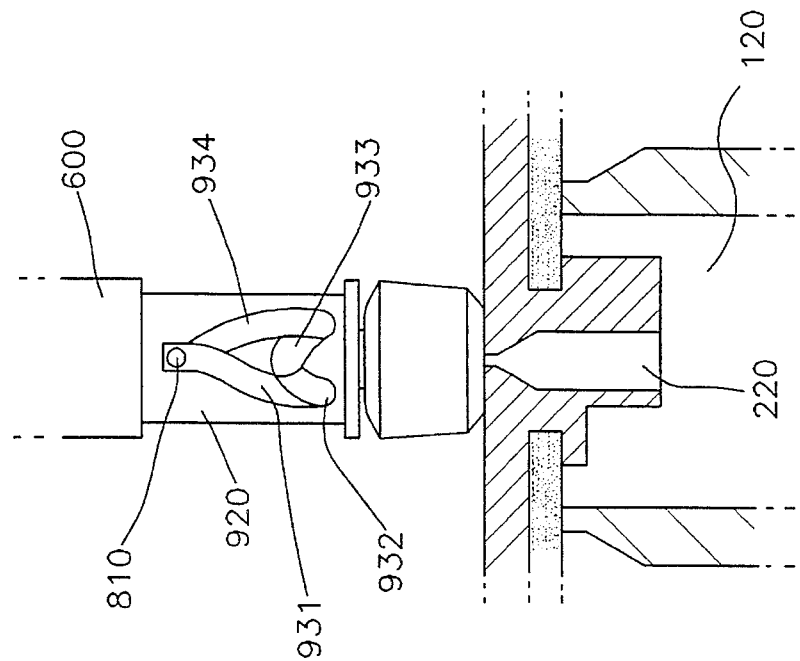

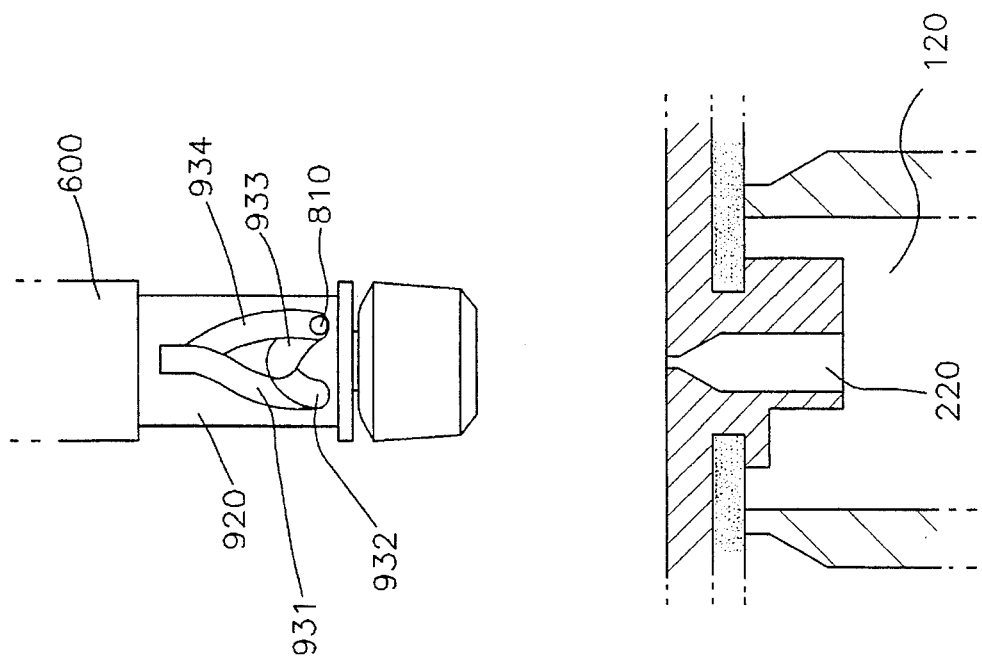
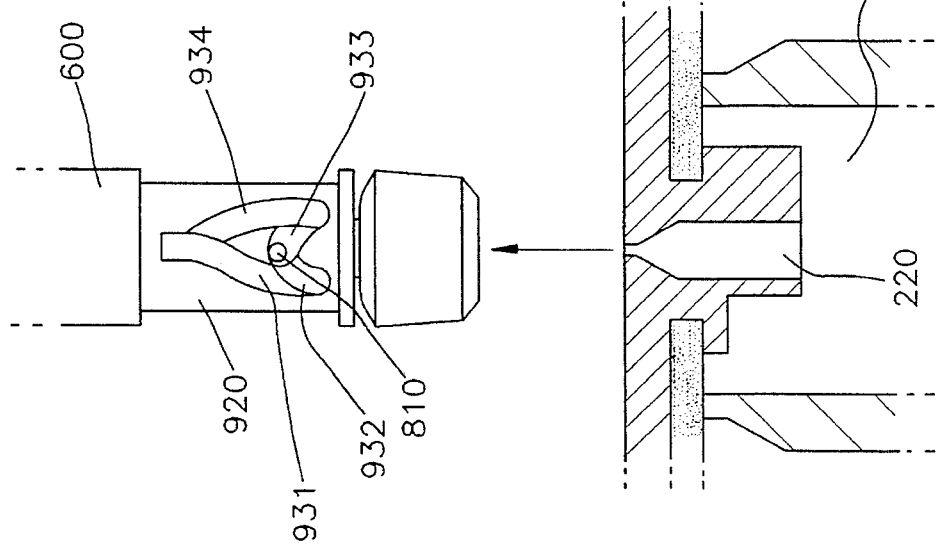

WATER-SUPPLY VALVE OF A WASHING MACHINE

BACKGROUND OF THE INVENTION

1. Field of the Invention

The present invention relates to a water-supply valve of a washing machine, and more particularly to a water-supply valve of a washing machine in which the consumption of electric power can be minimized in opening and closing the valve to supply water into and block off the water supply from a washing tub of the washing machine.

2. Description of the Prior Art

FIG. 5 is a side sectional view for showing a conventional water-supply valve of a washing machine, which is opened or closed by operation of solenoids to cause water to be supplied into or blocked off from a washing tub of the washing machine therethrough.

Referring to FIG. 5, a water-introducing tube 11 for inducing water is connected to a valve body 10 of the water-supply valve assembly, and a water-supply tube 12 for supplying water into the washing tub is vertically connected to valve body 10 near water-introducing tube 11. A reservoir 13 for interconnecting water-introducing tube 11 and a water-supply tube 12 is defined directly above water-supply tube 12.

A diaphragm 20 is disposed on the bottom surface of reservoir 13 and is in close contact with water-introducing tube 11 and a water-supply tube 12 to separate reservoir 13 therefrom. Diaphragm 20 has a water-inflow port 21 formed at an outer portion thereof to interconnect water-introducing tube 11 and reservoir 13 in order for water to flow into reservoir 13 therethrough, and a water-exhaust port 22 at the center thereof to interconnect reservoir 13 and water-supply tube 12 in order for water having been retained in reservoir 13 to be supplied into the washing tub therethrough.

An actuator chamber 31 interconnected to reservoir 13 is defined above reservoir 13 by a cylindrical wall 10a within the actuator housing of the water supply valve assembly. A solenoid 40 for generating magnetic force when electric power is supplied is disposed in cylindrical wall 10a.

An actuator rod 60 for opening/closing exhaust port is disposed in actuator chamber 31. Actuator rod 60 is elastically supported on the bottom of actuator chamber 31 by a spring 50.

In the above described conventional water-supply valve assembly, when water is not supplied into the washing tub, water-exhaust port 22 is closed so that water is not supplied but retained in reservoir 13, and accordingly the pressure in reservoir 13 is maintained to be the same as that in water-introducing tube 11.

In order to supply water into the washing tub, a voltage is applied to solenoid 40 so as to generate a magnetic force by solenoid 40. Then, actuator rod 60 is moved upward in actuator chamber 31 while compressing spring 50, and accordingly the water having been retained in reservoir 13 is supplied into the washing tub through water-exhaust port 22. Therefore, the pressure in reservoir 13 becomes lower than that in water-introducing tube 11, so diaphragm 13 is elevated by the pressure of the water flowing into reservoir 13 from water-introducing tube 11. Then, water-introducing tube 11 is directly interconnected to water-supply tube 12, so that water flows directly from water-introducing tube 11 into water-supply tube 12 without passing through water-inflow port and water-exhaust port.

When the voltage having been applied to solenoid 40 is interrupted, actuator rod 60 is restored to its initial position by spring 50, so water-exhaust port 22 is closed again.

In the above described conventional water-supply assembly, electric power supply to solenoid 40 must be continued while water is supplied into the washing tub, so the electric power consumption is too large. Further, fine wires of solenoid 40 can be broken or solenoid 40 can catch on fire due to heat generated by the continuous application of voltage to solenoid 40 during water supply.

SUMMARY OF THE INVENTION

The present invention is intended to overcome the above-discussed and numerous other disadvantages and deficiencies of the prior art.

Therefore, it is an object of the present invention to provide a water-supply valve assembly of a washing machine, in which electric power need not be continuously supplied to the water-supply valve assembly while water is supplied into a washing tub of the washing machine, so that the electric power consumption by the valve is greatly reduced, and a breaking of fine wires of solenoids and catching on fire of the solenoids due to heat generated by the continuous supply of power to the solenoids during water supply can be prevented.

To achieve the above object, the present invention provides a water-supply valve assembly of a washing machine comprising:

a actuator housing including an actuator chamber defined in a middle part thereof, a valve body including a reservoir defined within the valve body and beneath the actuator chamber and interconnected to the actuator chamber, and the actuator housing secured to the valve body;

a water-introducing tube interconnected to the reservoir to induce water thereinto;

a water-supply tube having a first end interconnected to the reservoir and the water-introducing tube, and a second end interconnected to a washing tub of the washing machine;

an actuator rod movable up and down in the actuator chamber and the reservoir;

a diaphragm disposed movably up and down in the reservoir according to ascent and descent of the actuator, the diaphragm having a water-inflow port, and a water-exhaust pore, the water-inflow pore interconnecting the water-introducing tube and the reservoir, and the water-exhaust port interconnecting the water-supply tube and the reservoir, respectively when the diaphragm is in close contact with a lower bottom surface of the reservoir to separate the reservoir from the water-introducing tube and the water-supply tube, the exhaust-port being blocked off by the actuator rod at its lowermost position;

a solenoid for elevating the actuator rod;

a guide including a partly-broken cylindrical tube for assembling the guide on the actuator rod, and the guide including a guide plate connected incorporated with the partly-broken cylindrical tube and having a guide groove of an inverted-heart shape formed therein, the guide groove having four guide surfaces which constitute a closed loop and which respectively have a final end higher than an initial end of a following guide surface, and selectively moving the actuator rod between an open and closed position;

a dish disposed and sourced in the reservoir between the diaphragm and the actuator chamber;

a spring for applying a downward biasing force to the actuator rod; and a hook bar including a body, and two pins, one of the pins moves in the closed loop along the guide surfaces, and the other of the pins is elastically held by the dish, wherein the hook bar is guided along the guide surfaces and accordingly the water-supply tube is switched between opened and closed states by said diaphragm, whenever the actuator rod is elevated to its uppermost position by the solenoid.

Preferably, the four guide surfaces include a first guide surface extending leftward and downward diagonally from the upper end thereof, a second guide surface extending rightward and upward diagonally from the lower end of the first guide surface to a height lower than the top of the guide groove, a third guide surface extending rightward and downward diagonally from the upper end of the second guide surface to a position having a height equal to that of the lower end of the first guide surface, and a fourth guide surface extending leftward and upward diagonally from the lower end of the third guide surface to the upper end of the first guide surface.

The guide surfaces constitute a closed loop, respectively extend along a curved path, and are respectively inclined in such a manner that each of their final ends is higher than each of their initial ends and each of the guide surfaces has a final end higher than an initial end of the following guide surface, so that the guide groove further has a first, a second, a third, and a fourth steps formed respectively between the first and second guide surfaces, the second and the third guide surfaces, the third and the fourth guide surfaces, and the fourth and the first guide surfaces.

It is also preferred that the dish includes an annular rim being in contact with a ceiling of the reservoir, and two legs disposed incorporated at opposite sides of the rim and fitted at lower parts in the reservoir, the rim having a center hole formed at the center thereof in order for the actuator rod to pass therethrough, and an arc section formed incorporated with the rim and protrudes downward while the opposite sides thereof being cut through so that two semicircular holes are formed thereat, one of the two legs having an elastic flap, the arc section being disposed on the rim in alignment with the elastic flap of the one leg.

It is also preferred that the first pin is engaged in the groove and circulates in the closed loop along the guide surfaces, and the second pin is fitted through the arc section and elastically supported by the flap.

In the water-supply valve assembly of a washing machine according the present invention as described above, when the actuator rod is pushed downward by the spring so as to block off water-exhaust port, the upper pin is positioned at the upper end of the first guide surface, and water is not supplied into the water-supply tube but retained in the reservoir.

When a voltage is applied to the solenoid, magnetic force is generated by the solenoid, and the actuator rod moves upward by virtue of the magnetic force while pressing the spring, and accordingly the water-exhaust port is opened and the upper pin slides downward along the first guide surface.

The upper pin continues sliding to transfer to the second guide surface across the first step at the terminal stage of the upward movement of the actuator rod, and then is located at the lower end of the second guide surface.

From this state, when electric power supply to the solenoid is ceased and thereby the magnetic force fades away, the actuator rod is returned downward again by the elastic biasing force of the spring. In this case, the upper pin slides upward along the second guide surface. The upper pin continues sliding to transfer to the third guide surface across the second step, and then is retained at the upper end of the third guide surface, and accordingly the water is supplied into the water-supply tube.

when water supply into the washing tub has been completed, electric power is supplied again to the solenoid, and then a magnetic force is generated again by the solenoid. The actuator rod moves upward again by the magnetic force of the solenoid while pressing the spring.

According to the upward movement of the actuator rod, the upper pin slides downward along the third guide surface. The upper pin continues sliding to transfer to the fourth guide surface across the third step at the terminal stage of the upward movement of the actuator rod.

When electric power supply to the solenoid is ceased and thereby the magnetic force fades away, the actuator rod is returned downward again by the elastic biasing force of the spring. The upper pin continues sliding to transfer to the first guide surface across the fourth step, and then is retained at the upper end of the first guide surface. Then, the diaphragm is in close contact with the bottom of the reservoir and the water-exhaust port is completely blocked off by the actuator rod, and accordingly water supply into the water-supply tube is interrupted.

BRIEF DESCRIPTION OF THE DRAWINGS

The above objects and other advantages of the present invention will become more apparent by describing in detail a preferred embodiment thereof with reference to the attached drawings, in which:

FIGS. 4A through 4D are constructional views for showing the operation of an actuator rod in an actuator chamber of the water-supply valve assembly of a washing machine shown in FIG. 1.

DETAILED DESCRIPTION OF PREFERRED EMBODIMENTS

Hereinafter, a preferred embodiment of the present invention will be described in detail with reference to the accompanying drawings.

Figure 1:
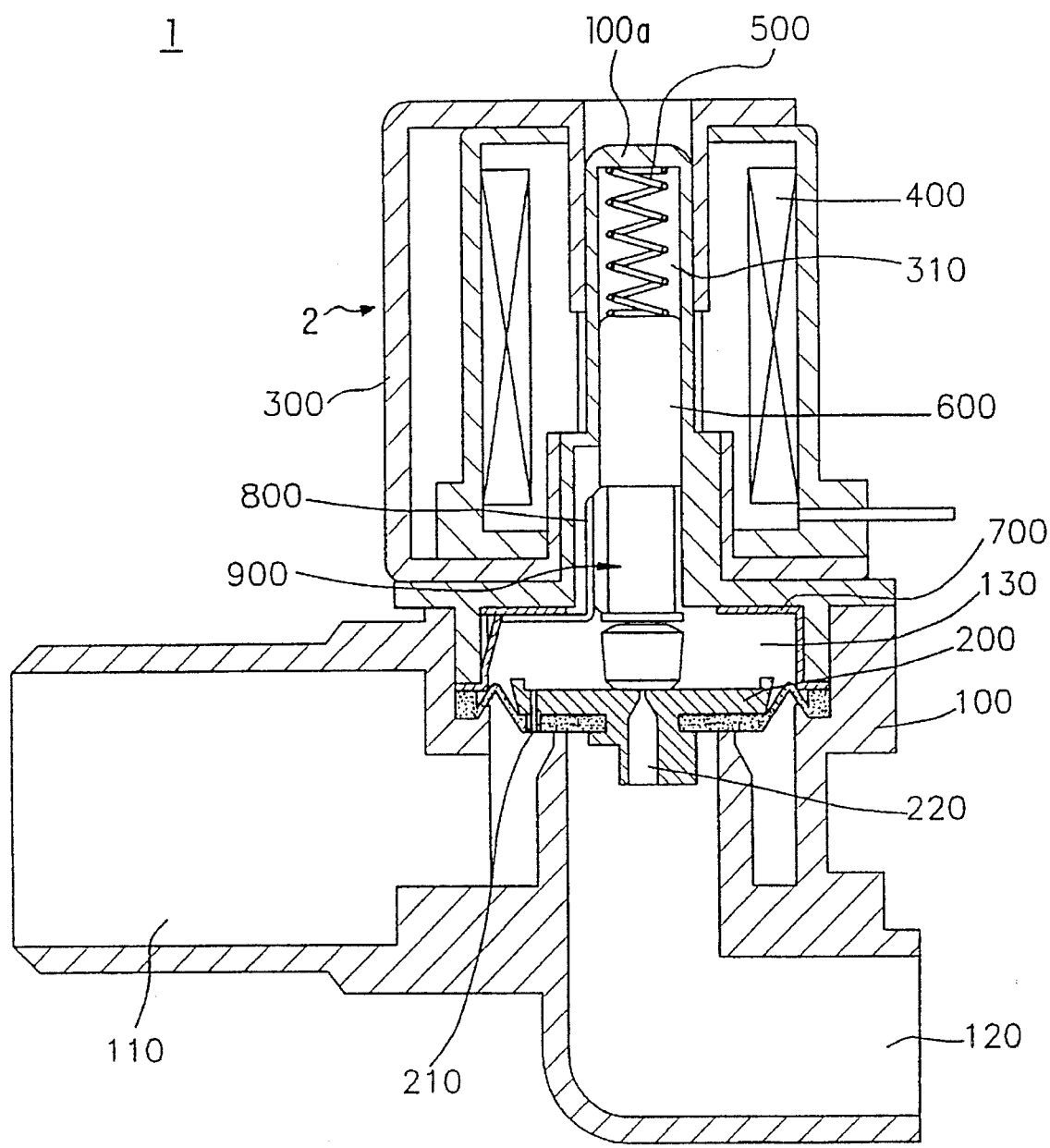
FIG. 1 is a side sectional view for showing a water-supply valve of a washing machine according to one embodiment of the present invention.

FIG. 1 is a side sectional view for showing a water-supply valve assembly of a washing machine according to an embodiment of the present invention. Referring to FIG. 1, a water-introducing tube 110 for inducing water is connected to a valve assembly body 100 of the water-supply valve, and a water-supply tube 120 for supplying water into the washing tub is vertically connected to valve body 100 near water-introducing tube 110. A reservoir 130 for interconnecting water-introducing tube 110 and a water-supply tube 120 is defined directly above water-supply tube 120. The water-supply valve assembly 1 also includes actuator housing 2 secured to and above valve body 100.

A diaphragm 200 is disposed on the bottom surface of reservoir 130, and is in close contact with water-introducing tube 110 and a water-supply tube 120 to separate reservoir 130 therefrom. Diaphragm 200 has a water-inflow port 210 formed at an outer portion thereof to interconnect water-introducing tube 110 and reservoir 130 in order for water to flow into reservoir 130 therethrough, and a water-exhaust port 220 at the center thereof to interconnect reservoir 130 and water-supply tube 120 in order for water having been retained in reservoir 130 to be supplied into the washing tub therethrough.

An actuator chamber 310 interconnected to reservoir 130 is defined above reservoir 130 by a cylindrical wall 100a of actuator housing 2.

A solenoid 400 for generating magnetic force when electric power is supplied thereto is disposed in cylindrical wall 100a.

An actuator rod 600 for opening/closing water-exhaust port 220 according to the operation of solenoid 400 is disposed in actuator chamber 310. Actuator rod 600 is elastically supported on the bottom of actuator chamber 310 by a spring 500.

Meanwhile, a reference numeral 300 not described above designates a case surrounding cylindrical wall 100a to protect the actuator housing 2.

A guide 900 is fixed on the cylindrical outer surface of actuator rod 600, and a dish 700 is disposed in reservoir 130. A hook bar 800 is engaged in dish 700 and guide 900.

Figure 2:
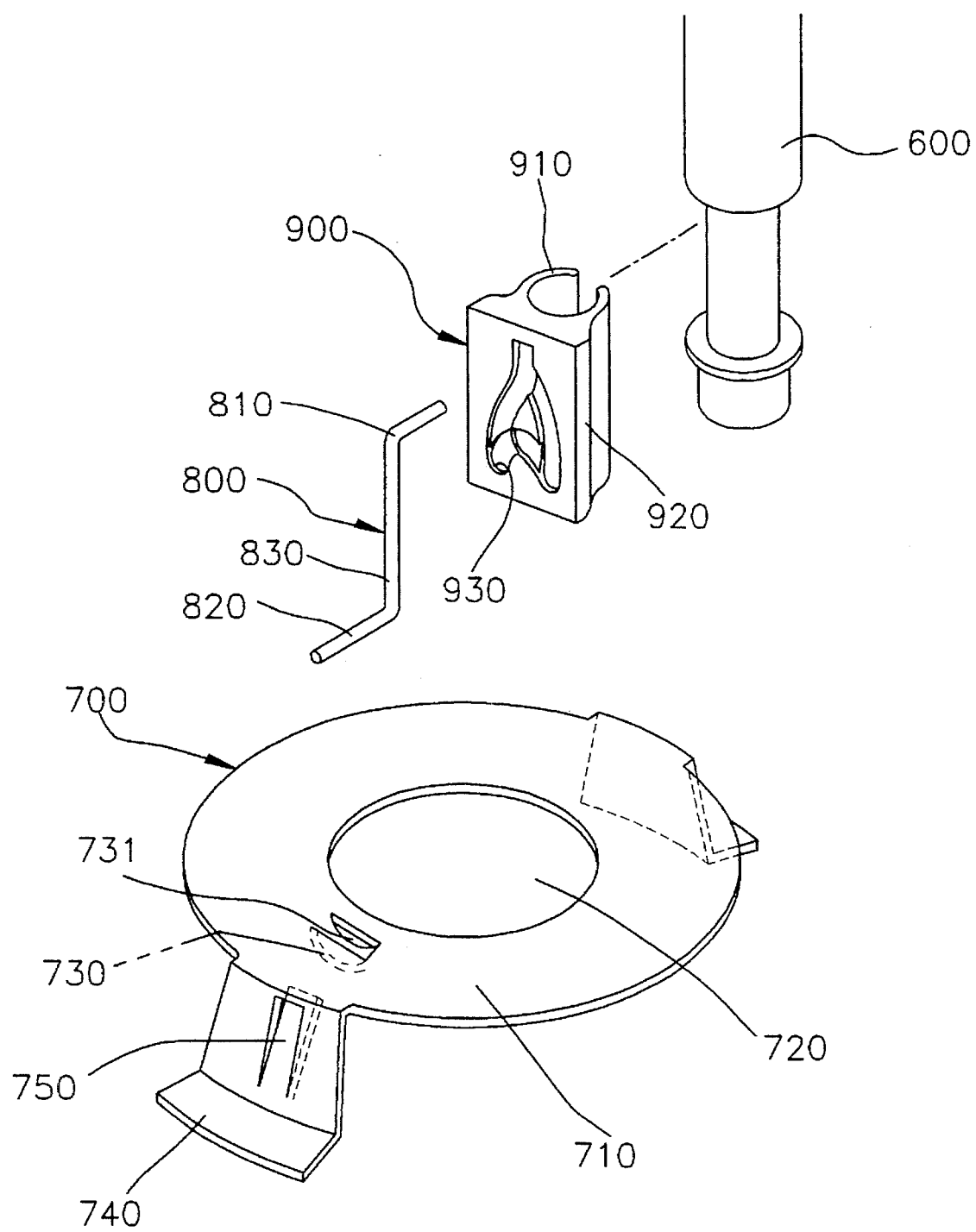
FIG. 2 is an enlarged exploded perspective view for showing several components disposed in the water-supply valve assembly of a washing machine shown in FIG. 1.

Referring to FIG. 2 showing actuator rod 600, dish 700, hook bar 800, and guide 900 in more detail, guide 900 has a cylindrical tube 910 surrounding actuator rod 600, and a guide plate 920 incorporated with cylindrical tube 910. Tube 910 may have various types of shapes for fixing guide 900 on actuator rod 600, and has a shape of a partly-broken cylinder particularly in the present embodiment.

Figure 3A:
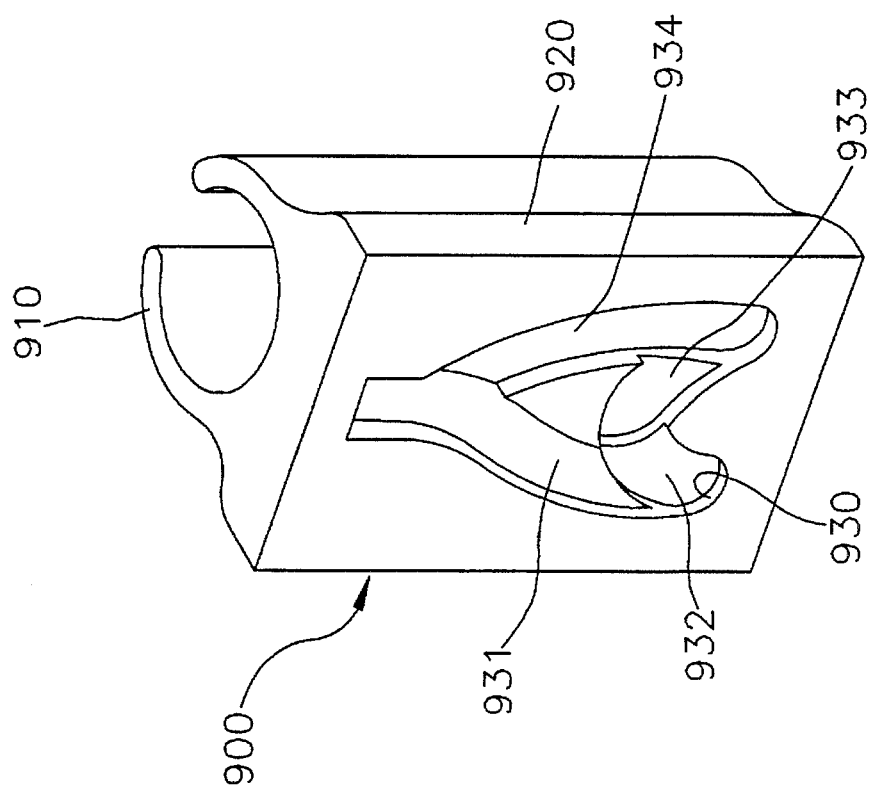
FIGS. 3A and 3B are a plan and a perspective views for showing a groove formed in a guide shown in FIG. 2.
Figure 3B:
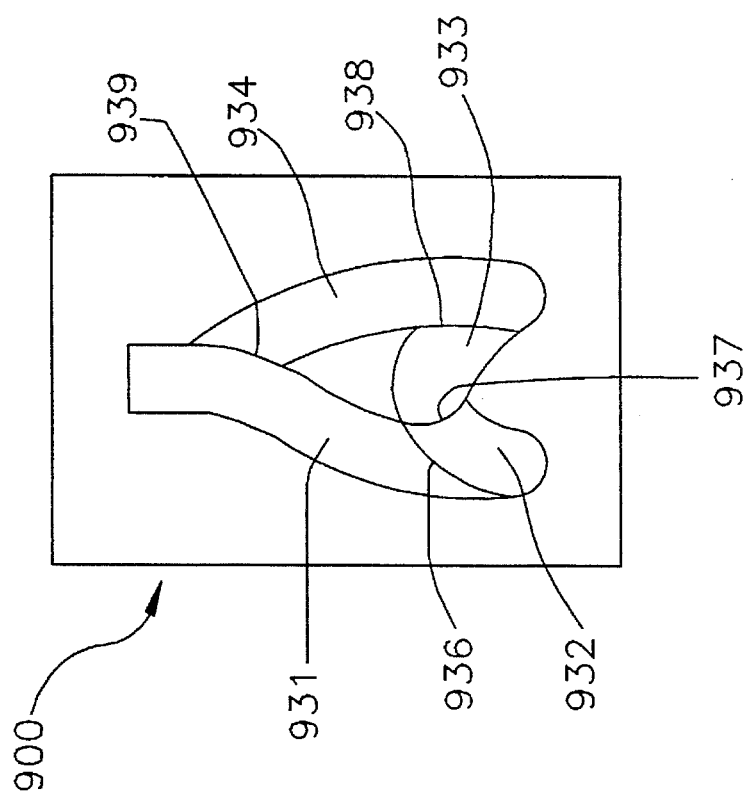
Figure 5:
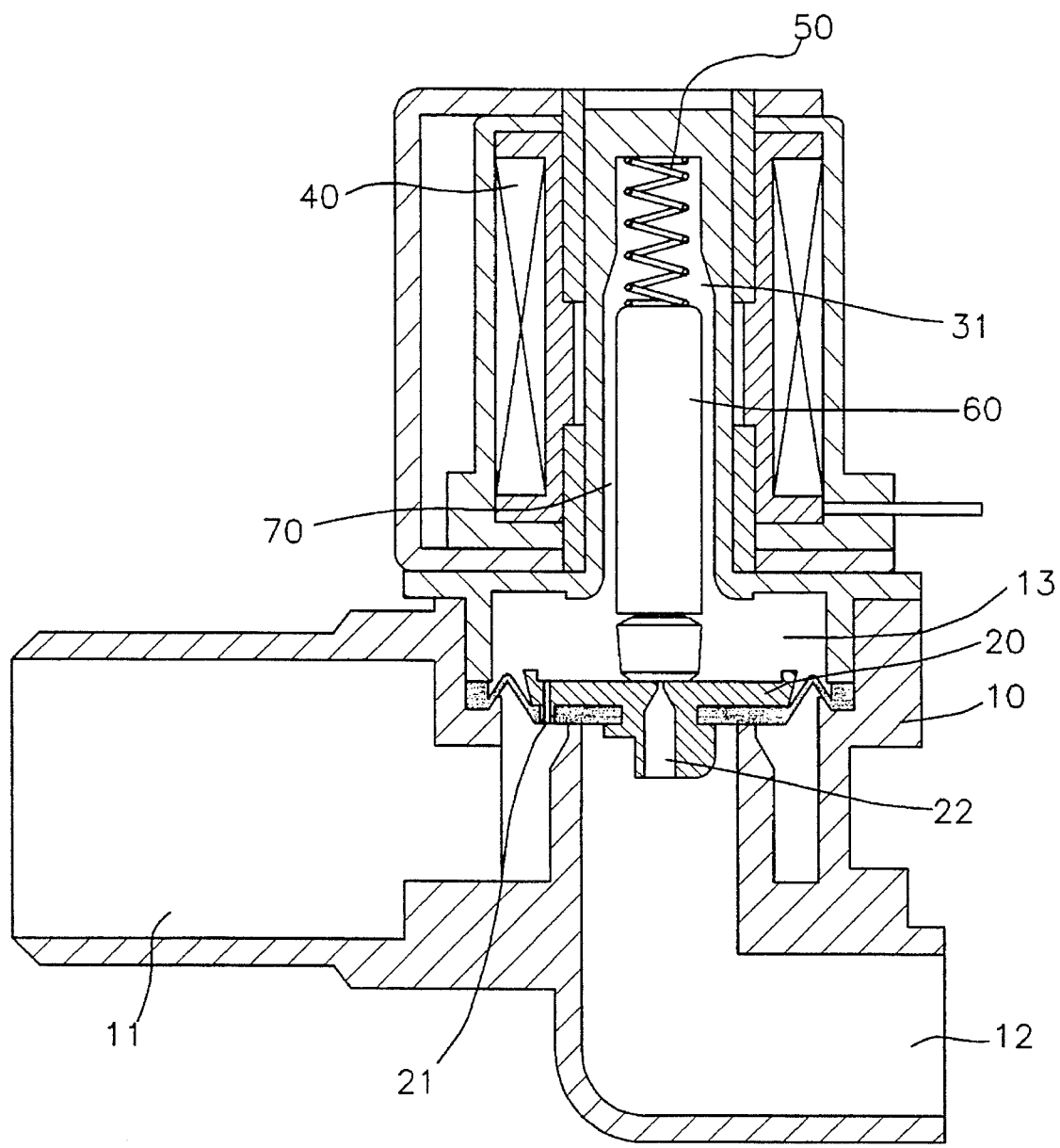
FIG. 5 is a side sectional view for showing a conventional water-supply valve assembly of a washing machine.

Guide plate 920 has a guide groove 930 of an inverted-heart shape formed therein as in detail shown in FIGS. 3A and 3B. Guide groove 930 has a first, second, third, and fourth guide surfaces 931, 932, 933, and 934. First guide surface 931 extends leftward and downward diagonally from the upper end thereof, second guide surface 932 extends rightward and upward diagonally from the lower end of first guide surface 931 to a position having a height lower than the top of guide groove 930, third guide surface 933 extends rightward and downward diagonally from the upper end of second guide surface 932 to a position having a height equal to that of the lower end of first guide surface 931, and fourth guide surface 934 extends leftward and upward diagonally from the lower end of third guide surface 933 to the upper end of first guide surface 931, respectively along curved paths. Therefore, the first, second, third, and fourth guide surfaces 931, 932, 933, and 934 constitute a closed loop.

First, second, third, and fourth guide surfaces 931, 932, 933, and 934 are respectively inclined in such a manner that each of their final ends is higher than each of their initial ends end each final end of the preceding guide surfaces is higher than each initial end of the following guide surfaces. Accordingly, a first, second, third, and fourth steps 936, 937, 938, 939 are formed respectively between first and second guide surfaces 931 and 932, second and third guide surfaces 932 and 933, third and fourth guide surfaces 932 and 934, and fourth and first guide surfaces 934 and 931.

Referring again to FIG. 2, dish 700 has an annular rim 710, and two legs 740 connected to the opposite sides of rim 710 with being incorporated therewith. Rim 710 has a center hole 720 formed at the center thereof in order for actuator rod 600 to pass therethrough, and an arc section 730 formed at a position of rim 710 near one of two legs 740. Arc section 730 is formed incorporated with rim 710, and protrudes downward while the opposite sides thereof being cut through so that two semicircular holes 731 are formed thereat. The one leg 740 near arc section 730 has an elastic flap 750 provided at the center thereof in alignment with arc section 730.

Dish 700 is disposed in reservoir 130 in such a manner that rim 710 is in contact with the ceiling of reservoir 130, and legs 740 are fitted at lower parts in reservoir 130.

Meanwhile, hook bar 800 has a shape of letter "s" without curves. That is, hook bar 800 has a bar body 830, and two pins 810, 820 respectively extending in opposite directions to each other respectively at a right angle from the opposite ends of bar body 830. In the present embodiment, the two pins are a short upper pin 810, and a long lower pin 820. Upper pin 810 is engaged in guide groove 930, and lower pin 820 is inserted through arc section 730 from center hole 720 and abuts against elastic flap 750. Lower pin 820 is elastically supported by elastic flap 750, so that upper pin 810 comes in close contact with guide surfaces 931, 932, 933, and 934 in guide groove 930.

Hereinafter, the operation of the water-supply valve assembly 1 having the above construction according to the present embodiment of the present invention will be described with reference to FIGS. 4A, 4B, 4C, and 4D.

When actuator rod 600 is pusher downward by spring 500 so as to block off water-exhaust port 220, upper pin 810 is positioned at the upper end of first guide surface 931 as shown in FIG. 4A, and water having been introduced into reservoir 130 through water-introducing tube 110 and water-inflow port 210 is not supplied into water-supply tube 120 through water-exhaust port 220 but retained in reservoir 130. In this case, the pressure in reservoir 130 is maintained to be the same as that in water-introducing tube 110.

When a voltage is applied to solenoid 400 automatically by a microcomputer or manually by handling a switch, magnetic force is generated by solenoid 400, and actuator rod 600 having been retained at its lowermost position by spring 500 moves upward by virtue of the magnetic force while pressing spring 500, and accordingly water-exhaust port 220 is opened and upper pin 810 slides downward along first guide surface 931. In this case, actuator rod 600 rotates due to the sliding contact between upper pin 810 and first guide surface 931.

Upper pin 810 continue sliding to transfer to second guide surface 932 across first step 936 at the terminal stage of the upward movement of actuator rod 600. At that time, spring 500 is completely compressed so that actuator rod 600 no longer moves upward, and upper pin 810 is located at the lower end of second guide surface 932 as shown in FIG. 4B.

Meanwhile, when electric power supply to solenoid 400 is ceased and thereby the magnetic force fades away, actuator rod 600 having moved upward while compressing spring 500 is returned downward again by the elastic biasing force of spring 500. In this case, upper pin 810 is not returned to first guide surface 931 due to first step 936 but slides upward along second guide surface 932. Upper pin 810 continues sliding to transfer to third guide surface 933 across second step 937, and then is retained at the upper end of third guide surface 933 as shown in FIG. 4C. In this case, actuator rod 500 rotates also due to the sliding contact between upper pin 810 and second guide surface 932.

When upper pin 810 is retained at the upper end of third guide surface 933 as shown in FIG. 4C, actuator rod 600 stops rotating and moving downward but is held thereat. Therefore, water-exhaust port 220 is maintained open, and accordingly the water having been retained in reservoir 130 is supplied into water-supply tube 120 through water-exhaust port 220. In this case, the pressure in reservoir 130 decreases below that in water-introducing tube 110, so that water introduced into water-introducing tube 110 pushes up diaphragm 200, and thereby water-introducing tube 110 and water-supply tube 120 are interconnected with each other and water is directly supplied from water-introducing tube 110 to water-supply tube 120 without passing through water-inflow port 210 and water-exhaust port 220.

When water supply into the washing tub has been completed, electric power is supplied again to solenoid 400, and then a magnetic force is generated again by solenoid 400. Actuator rod 600 moves upward again by the magnetic force of solenoid 400 while pressing spring 500.

According to the upward movement of actuator rod 600, upper pin 810 is not returned to second guide surface 932 due to second step 937 but slides downward along third guide surface 933. Upper pin 810 continues sliding to transfer to fourth guide surface 934 across third step 938 at the terminal stage of the upward movement of actuator rod 600. At that time, spring 500 is completely compressed so that actuator rod 600 no longer moves upward, and upper pin 810 is located at the lower end of fourth guide surface 934 as shown in FIG. 4D.

As similarly as described above, actuator rod 600 rotates also due to the sliding contact between upper pin 810 and third guide surface 933 in the course of the upward movement of actuator rod 600.

Meanwhile, when electric power supply to solenoid 400 is ceased and thereby the magnetic force fades away, actuator rod 600 having moved upward while compressing spring 500 is returned downward again by the elastic biasing force of spring 500. In this case, upper pin 810 is not returned to third guide surface 933 due to third step 937 but slides upward along fourth guide surface 934, and actuator rod 600 pushes diaphragm 200 downward while blocking off water-exhaust port 220. Upper pin 810 continues sliding to transfer to first guide surface 931 across fourth step 939, and then is retained at the upper end of first guide surface 931 as shown in FIG. 4A. Then, diaphragm 200 is in close contact with the bottom of reservoir 130 and water-exhaust port 220 is completely blocked off by actuator rod 230, and accordingly water supply into water-supply tube is interrupted.

As described above, actuator rod 600 rotates due to the sliding contact between upper pin 810 and first, second, third, and fourth guide surfaces 931, 932, 933 and 934 in the course of the upward and downward diagonal movement of actuator rod 600.

As described above in detail, in a water-supply valve assembly 1 of a washing machine according to the present invention, electric power need not be continuously supplied to the water-supply valve assembly while water is supplied into a washing tub of the washing machine, but opened or closed state of the valve assembly is maintained only by an instantaneous power supply to the valve at a moment of supplying water or interrupting the water supply. Therefore, the electric power consumption by the valve assembly is be greatly reduced, and the breaking of fine wires of solenoid 40 and catching on fire of solenoid 40 due to heat generated by the continuous supply of power to solenoid 40 during water supply can be prevented. Further, reliable water supply into the washing tub is guaranteed While the present invention has been particularly shown and described with reference to a particular embodiment thereof, it will be understood by those skilled in the art that various changes in form and details may be effected therein without departing from the spirit and scope of the invention as defined by the appended claims.

What is claimed is:

1. A water-supply valve assembly of a washing machine comprising:

an actuator housing including an actuator chamber defined in a middle part thereof, a valve body including a reservoir defined within the valve body and beneath the actuator chamber and interconnected to the actuator chamber, and the actuator housing being secured to the valve body;

a water-introducing tube interconnected to the reservoir to induce water thereinto;

a water-supply tube having a first end interconnected to the reservoir and the water-introducing tube, and a second end interconnected to a washing tub of the washing machine;

an actuator rod movable up and down in the actuator chamber and the reservoir;

a diaphragm disposed movably up and down in the reservoir according to ascent and descent of the actuator, the diaphragm having a water-inflow port, and a water-exhaust port, the water-inflow port interconnecting the water-introducing tube and the reservoir, and the water-exhaust port interconnecting the water-supply tube and the reservoir, respectively, when the diaphragm is in close contact with a lower bottom surface of the reservoir to separate the reservoir from the water-introducing tube and the water-supply tube, the water-exhaust port being blocked off by the actuator rod at its lowermost position;

a first means for elevating the actuator rod;

a guide including a second means for assembling the guide on the actuator rod, and the guide including a guide plate incorporated with the second means and having a guide groove of an inverted-heart shape formed therein, the guide groove having four guide surfaces which constitute a closed loop and which respectively have a final end higher than an initial end of a following guide surface, and selectively moving the actuator rod between open and closed positions;

a third means disposed and secured in the reservoir between the diaphragm and the actuator chamber;

a fourth means for applying a downward biasing force to the actuator rod; and a hook bar including a body, and two pins, one of the pins moves in the closed loop along the guide surfaces, and the other of the pins is elastically supported by the third means, wherein the one pin of the hook bar is guided along the guide surfaces and accordingly the water-supply tube is switched between opened and closed states by the diaphragm, whenever the actuator rod is elevated to its uppermost position by the first means.

2. The valve of a washing machine as claimed in claim 1, wherein the first means has a solenoid within the actuator housing and enclosing the actuator chamber in a cylindrical wall defining the actuator chamber, the solenoid generating a magnetic force by a voltage applied thereto to elevate the actuator rod against the downward biasing force of the fourth means.

3. The valve of a washing machine as claimed in claim 1, wherein the second means has a partly-broken cylindrical tube surrounding and fixed on an outer peripheral surface of the actuator rod.

4. The valve of a washing machine as claimed in claim 1, wherein the four guide surfaces have a first guide surface extending leftward and downward diagonally from the upper end thereof, a second guide surface extending rightward and upward diagonally from the lower end of the first guide surface to a height lower than the top of the guide groove, a third guide surface extending rightward and downward diagonally from the upper end of the second guide surface to a position having a height equal to that of the lower end of the first guide surface, and a fourth guide surface extending leftward and upward diagonally from the lower end of the third guide surface to the upper end of the first guide surface.

5. The valve of a washing machine as claimed in claim 4, wherein the first, second, third, and fourth guide surfaces are inclined in such a manner that each of their final ends is higher than each of their initial ends, so that the guide groove further has a first, a second, a third, and a fourth steps formed respectively between the first and second guide surfaces, the second and the third guide surfaces, the third and the fourth guide surfaces, and the fourth and the first guide surfaces.

6. The valve of a washing machine as claimed in claim 1, wherein the four guide surfaces extend along a curved path.

7. The valve of a washing machine as claimed in claim 1, wherein the third means is a dish having an annular rim, and two legs disposed incorporated at opposite sides of the rim, the rim having a center hole formed at the center thereof in order for the actuator rod to pass therethrough, and an arc section in which the other of the pins of the hook bar is fitted.

8. The valve of a washing machine as claimed in claim 7, wherein the rim is in contact with a ceiling of the reservoir and the legs are fitted at lower parts in the reservoir.

9. The valve of a washing machine as claimed in claim 7, wherein the arc section is formed incorporated with the rim and protrudes downward while the opposite sides thereof being cut through so that two semicircular holes are formed thereat.

10. The valve of a washing machine as claimed in claim 9, wherein one of the two legs has an elastic flap.

11. The valve of a washing machine as claimed in claim 10, wherein the arc section is disposed on the rim in alignment with the elastic flap of the one leg.

12. The valve of a washing machine as claimed in claim 1, wherein the two pins respectively extend at a right angle with the body of the hook bar and in opposite directions to each other.

13. The valve of a washing machine as claimed in claim 11, wherein the two pins respectively extend at a right angle with the body of the hook bar and in opposite directions to each other.

14. The valve of a washing machine as claimed in claim 13, wherein the two pins have a first pin engaged and guided in the groove, and a second pin inserted through the arc section and supported by the elastic flap.

15. The valve of a washing machine as claimed in claim 1, wherein the one pin is shorter than the other pin.

16. The valve of a washing machine as claimed in claim 1, wherein the fourth means has a spring disposed on an upper bottom surface of the actuator chamber to force the actuator rod by the downward elastic biasing force thereof.

17. A water-supply valve assembly of a washing machine comprising:

an actuator housing including an actuator chamber defined in a middle part thereof, a valve body including a reservoir defined within the valve body and beneath the actuator chamber and interconnected to the actuator chamber, and the actuator housing being secured to the valve body;

a water-introducing tube interconnected to the reservoir to induce water thereinto;

a water-supply tube having a first end interconnected to the reservoir and the water-introducing tube, and a second end interconnected to a washing tub of the washing machine;

an actuator rod movable up and down in the actuator chamber and the reservoir;

a diaphragm disposed movably up and down in the reservoir according to ascent and descent of the actuator, the diaphragm having a water-inflow port, and a water-exhaust port, the water-inflow port interconnecting the water-introducing tube and the reservoir, and the water-exhaust port interconnecting the water-supply tube and the reservoir, respectively, when the diaphragm is in close contact with a lower bottom surface of the reservoir to separate the reservoir from the water-introducing tube and the water-supply tube, the water-exhaust port being blocked off by the actuator rod at its lowermost position;

a solenoid within the actuator housing and enclosing the actuator chamber in a cylindrical wall defining the actuator chamber, the solenoid generating a magnetic force by a voltage applied thereto to elevate the actuator rod;

a guide including a partly-broken cylindrical tube surrounding and fixed on an outer peripheral surface of the actuator rod to assemble the guide on the actuator rod, and the guide including a guide plate incorporated with the partly-broken cylindrical tube and having a guide groove of an inverted-heart shape formed therein, the guide groove including a first guide surface extending leftward and downward diagonally from the upper end thereof, a second guide surface extending rightward and upward diagonally from the lower end of the first guide surface to a height lower than the top of the guide groove, a third guide surface extending rightward and downward diagonally from the upper end of the second guide surface to a position having a height equal to that of the lower end of the first guide surface, and a fourth guide surface extending leftward and upward diagonally from the lower end of the third guide surface to the upper end of the first guide surface, the guide surfaces constituting a closed loop, respectively, extending along a curved path, and being respectively inclined in such a manner that each of their final ends is higher than each of their initial ends and each of the guide surfaces has a final end higher than an initial end of the following guide surface, so that the guide groove further has first, second, third, and fourth steps formed respectively between the first and second guide surfaces, the second and the third guide surfaces, the third and the fourth guide surfaces, and the fourth and the first guide surfaces;

a dish disposed and secured in the reservoir, the dish including an annular rim being in contact with a ceiling of the reservoir, and two legs disposed incorporated at opposite sides of the rim and fitted at lower parts in the reservoir, the rim having a center hole formed at the center thereof in order for the actuator rod to pass therethrough, and an arc section formed incorporated with the rim and protruding downward while the opposite sides thereof being cut through so that two semicircular holes are formed thereat, one of the two legs having an elastic flap, the arc section being disposed on the rim in alignment with the elastic flap of the one leg;

a spring disposed on an upper bottom surface of the actuator chamber to force the actuator rod by the downward elastic biasing force thereof; and a hook bar including a body, and a first and a second pins respectively extending at a right angle with the body of the hook bar and in opposite directions to each other, the first pin engaged in the groove and circulating in the closed loop along the guide surfaces, and the second pin being fitted through the arc section and elastically supported by the flap, wherein the first pin is guided along the guide surfaces and accordingly the water-supply tube is switched between opened and closed states by the diaphragm, whenever the actuator rod is elevated to its uppermost position by applying a voltage to the solenoid.

* * * * *